(12) United States Patent
Kim et al.

(10) Patent No.: US 10,539,044 B2
(45) Date of Patent: Jan. 21, 2020

(54) COMBUSTION POWER GENERATION APPARATUS USING ORGANIC FUEL

(71) Applicant: Seong Bang Nam, Gyeonggi-do (KR)

(72) Inventors: Joon Young Kim, Yongin-si (KR); Seong Bang Nam, Yongin-si (KR)

(*) Notice: Subject to any disclaimer, the term of this patent is extended or adjusted under 35 U.S.C. 154(b) by 0 days.

(21) Appl. No.: 16/087,292

(22) PCT Filed: Dec. 5, 2017

(86) PCT No.: PCT/KR2017/014122
§ 371 (c)(1),
(2) Date: Sep. 21, 2018

(87) PCT Pub. No.: WO2018/110884
PCT Pub. Date: Jun. 21, 2018

(65) Prior Publication Data
US 2019/0292948 A1    Sep. 26, 2019

(30) Foreign Application Priority Data

Dec. 12, 2016 (KR) .................. 10-2016-0168807

(51) Int. Cl.
*F23G 5/027* (2006.01)
*F01K 23/06* (2006.01)
(Continued)

(52) U.S. Cl.
CPC .............. *F01K 23/06* (2013.01); *F01K 25/06* (2013.01); *F02G 1/043* (2013.01); *F23D 14/66* (2013.01); *F23L 1/00* (2013.01)

(58) Field of Classification Search
CPC .......... F23G 5/006; F23G 5/027; F23G 5/085; F23G 5/01
See application file for complete search history.

(56) References Cited

U.S. PATENT DOCUMENTS 4,445,463 A * 5/1984 Casper .................. F22B 1/1884
122/510
6,435,139 B1 * 8/2002 Brucher ................ F22B 1/1838
122/30

(Continued)

FOREIGN PATENT DOCUMENTS

JP          3128784       1/2007
KR    10-2004-0098648    11/2004
(Continued)

*Primary Examiner* — Mark A Laurenzi
*Assistant Examiner* — Shafiq Mian
(74) *Attorney, Agent, or Firm* — Don D. Cha; HDC IP Law, LLP (57) ABSTRACT

The present invention relates to a combustion generation apparatus which generates power using organic materials. According to one embodiment of the present invention, the combustion generation apparatus includes a fuel supply unit which includes a plurality of single fuel suppliers configured to supply different organic raw materials, a fuel mixer configured to mix the organic raw materials supplied by the single fuel suppliers, and a mixed fuel supplier configured to receive the organic raw materials uniformly mixed in the fuel mixer, a reaction unit which includes a combustion chamber configured to burn the organic raw materials supplied by the mixed fuel supplier, and a generation unit which includes an internal generator configured to generate power using heat energy generated by a combustion reaction of the organic materials in the combustion chamber and an external generator configured to generate power using heat energy released outward from the combustion chamber.

10 Claims, 8 Drawing Sheets

(51) Int. Cl.
    *F01K 25/06*     (2006.01)
    *F23D 14/66*     (2006.01)
    *F23L 1/00*     (2006.01)
    *F02G 1/043*     (2006.01)

(56) References Cited

U.S. PATENT DOCUMENTS

| | | | | |
|---|---|---|---|---|
| 7,465,843 | B2* | 12/2008 | Gnedenko | F23G 5/006 |
| | | | | 204/164 |
| 2004/0200222 | A1* | 10/2004 | Marin | F22B 31/00 |
| | | | | 60/679 |
| 2006/0240368 | A1* | 10/2006 | Duesel, Jr. | F23G 7/08 |
| | | | | 431/5 |
| 2008/0118310 | A1* | 5/2008 | Graham | F23G 7/066 |
| | | | | 405/129.95 |
| 2010/0206248 | A1* | 8/2010 | Mok | C10L 3/00 |
| | | | | 122/17.1 |
| 2012/0000200 | A1* | 1/2012 | Freund | F01K 23/10 |
| | | | | 60/645 |
| 2014/0096522 | A1* | 4/2014 | Kirchner | F01K 7/34 |
| | | | | 60/648 |
| 2015/0121870 | A1* | 5/2015 | Delson | F23G 5/04 |
| | | | | 60/645 |

FOREIGN PATENT DOCUMENTS

| | | |
|---|---|---|
| KR | 10-2010-0097441 | 9/2010 |
| KR | 10-2010-0106813 | 10/2010 |
| KR | 10-2012-0117437 | 10/2012 |

* cited by examiner

COMBUSTION POWER GENERATION APPARATUS USING ORGANIC FUEL

CROSS-REFERENCE TO RELATED APPLICATIONS

This is 371 U.S. National Stage application of PCT Patent Application No. PCT/KR2017/014122, filed Dec. 5, 2017, which claims the priority benefit of Korean Patent Application No. 2016-0168807, filed on Dec. 12, 2016, all of which are incorporated herein by reference in their entirety.

FIELD OF THE INVENTION

The present invention relates to a combustion generation apparatus capable of generating power using organic materials, and more particularly, to a combustion generation apparatus capable of generating power using heat energy generated by burning organic materials in which a variety of types of organic materials including large amounts of carbon and hydrogen are mixed.

BACKGROUND OF THE INVENTION

In Korea in which most of energy sources are dependent on imports, in an aspect of national security or to maintain a continuous economic growth, it is necessary to establish a long-term energy source supply policy capable of maximally reducing a level of dependence on energy imports and to develop fundamental clean alternative energy.

In this reality, biomass is being regarded as one field of alternative energy capable of easing concerns of exhaustion of fossil fuel and environmental pollution.

Biomass is a term which refers to biological organisms including plant bodies generated by photosynthesis of microorganisms and plants which receive solar energy, fungus bodies, and animal bodies which live on the same. Accordingly, biomass resources have a comprehensive meaning which includes farinaceous resources such as grains, cellulosic resources including forest trees and agricultural by-products such as rice straws and rice husks, saccharic resources such as sugar canes and sugar beets, and organic waste such as food waste and the like.

Currently, biomass having a dry weight of about 1.8 to 2 trillion tons is present on the earth, biomass of 200 billion tons corresponding to about 10% of the amount is annually produced, which corresponds to about 0.1% of solar energy beating down on the earth and accumulated as biomass. Also, since biomass basically has zero environmental effect caused by CO2, biomass is an attractive energy source in comparison to fossil fuel.

Meanwhile, conventional generation systems may be classified largely into a method using fossil fuel and a method using biomass as new renewable energy.

A conventional generation system using fossil fuel needs additional post-treatment equipment for treating a large amount of heavy metal and sulfur compounds included in the fuel such that the equipment and apparatus are enlarged. Also, since there is a limitation in miniaturizing a generation system, generation systems have been developed in the unit of plant. Even in an economic aspect, since secondary pollutants such as tar and waste water are generated in post-treatment equipment of a generation system, huge operating costs are necessary for reprocessing the secondary pollutants. Nonetheless, due to tightening of international environmental regulations, it is expected that costs for adding and operating carbon dioxide reducing equipment increase. Also, since supply and costs for raw materials fluctuate according to external factors such as international politics, economic situations, and the like, disturbance in costs for operation is caused such that it is basically difficult to make a stable profit.

To solve the above-problems of conventional generation systems using fossil fuel, generation systems using biomass such as waste and the like have been suggested. A biomass generation system includes a gasification process of generating a synthesis gas which includes less tar and dust by thermally decomposing biomass such as domestic waste, food waste, and the like and generation equipment configured to generate power using the synthesis gas. Here, not only the gasification process needs investment costs for large-scaled equipment for purifying the synthesis gas and but also more energy loss occurs than when combustion heat of biomass is directly utilized. Also, since types of waste usable as biomass are limited, additional input of workers for classification of collected wastes is considerable. Since additional post-treatment equipment for removing harmful substances in the waste is needed like conventional generation systems using fossil fuel, it is difficult to fundamentally decrease a size of an apparatus and to reduce maintenance costs.

Small generation systems adequate for domestic use among conventional generation systems are generally used for heating and hot water supply and may be classified into a cogeneration method of petroleum/gas boilers and a heat source supply method of wood pellet boilers. The above conventional small generation systems have an advantage of simultaneously performing hot water supply and power generation but have a problem in which an excessive heat source is consumed for producing hot water such that electricity generation efficiency is significantly lower than that of large generation systems. Also, since large amounts of impurities and chemical composition are included in wood pellets used as a raw material, when wood pellets are burned, a secondary pollution source is generated. When high-quality wood pellets having fewer impurities are used to solve this, economic feasibility is significantly decreased and there is a difficulty in practical application.

SUMMARY OF THE INVENTION

The present invention is directed to providing a combustion generation apparatus capable of generating power using organic raw materials and providing a small generation system.

The present invention provides a combustion generation apparatus capable of generating power using organic raw materials.

According to one embodiment of the present invention, the combustion generation apparatus includes a fuel supply unit which includes a plurality of single fuel suppliers configured to supply different organic raw materials, a fuel mixer configured to mix the organic raw materials supplied by the single fuel suppliers, and a mixed fuel supplier configured to receive the organic raw materials uniformly mixed in the fuel mixer, a reaction unit which includes a combustion chamber configured to burn the organic raw materials supplied by the mixed fuel supplier, and a generation unit which includes an internal generator configured to generate power using heat energy generated by a combustion reaction of the organic-materials in the combustion chamber and an external generator configured to generate power using heat energy released outward from the combustion chamber.

The internal generator may generate power using a Stirling engine located in an internal space of the combustion chamber, and the external generator may include a collector located around the combustion chamber and configured to absorb heat energy released outward from the combustion chamber and a generating element configured to generate power using heat supplied from the collector.

The fuel mixer may include a mixing chamber which has a mixing space therein, in which the organic raw materials are mixed and a fuel mixing member located in the mixing chamber and configured to mix the organic raw materials.

The combustion generation apparatus may further include a reaction by-product discharge unit configured to discharge reaction by-product generated after the organic raw materials are burned in the combustion chamber. Here, the reaction by-product discharge unit may include a reaction by-product container which accommodates the reaction by-products generated in the combustion chamber and a reaction by-product supply pipe connected to the combustion chamber and the reaction by-product container and configured to supply the reaction by-products generated in the combustion chamber to the reaction by-product container.

The reaction by-product supply pipe may be provided to have a shape which has a cross section gradually increasing from the combustion chamber toward the reaction by-product container.

The combustion generation apparatus may further include an oxidizer supply unit configured to supply an oxidizer to the combustion chamber. Here, the oxidizer supply unit may include an oxidizer supplier configured to supply a gaseous oxidizer to the combustion chamber and an oxidizer supply line connected to the oxidizer supplier and configured to supply the oxidizer to the combustion chamber.

The oxidizer supply line may include a first oxidizer supply line connected to the oxidizer supplier and the reaction by-product container and configured to supply the oxidizer supplied by the oxidizer supplier to the reaction by-products and a second oxidizer supply line connected to the combustion chamber and the reaction by-product container and configured to supply the oxidizer, which exchanges heat with the reaction by-products in the reaction by-product container, to the combustion chamber.

The combustion generation apparatus may further include a gas discharge unit configured to discharge a combustion gas generated after a combustion reaction of the organic materials in the combustion chamber. Here, the gas discharge unit may include a gas supply line connected to the combustion chamber and configured to supply the combustion gas of the combustion chamber to the fuel mixer, a gas discharge line configured to discharge outward the combustion gas which exchanges heat with the organic materials in the fuel mixer and is discharged, and a combustion gas filter coupled to the gas discharge line and configured to filter the combustion gas.

The gas discharge unit may further include a pollutant removal portion installed on the gas supply line and having a catalyst to remove pollutants of the combustion gas supplied from the combustion chamber. Here, the combustion generation apparatus may further include a power unit configured to store power supplied from the generation unit and to supply the power to another apparatus.

The organic raw materials may include used coffee grounds, coconut dregs, forest dregs, wood pellets, and waste cooking oil.

According to one embodiment of the present invention, a combustion generation apparatus may generate power using heat generated in a combustion chamber and heat released outward. That is, power generation efficiency may be improved by generating power using the heat released from the combustion chamber.

Also, the combustion generation apparatus according to one embodiment of the present invention may minimize environmental pollution by minimizing pollutants in a combustion gas discharged outward through a pollutant removal portion or a combustion gas filter.

BRIEF DESCRIPTION OF THE DRAWINGS

Since the following drawings attached to the specification illustrate one embodiment of the present invention and allow, with the following detailed description, the technical concept of the present invention to be further understood, the present invention should not be understood while being limited to those shown in the drawings.

DETAILED DESCRIPTION OF THE INVENTION

Hereinafter, embodiments of the present invention will be described in more detail with reference to the attached drawings. The embodiments of the present invention may be changed in a variety of shapes, and the scope of the present invention should not be understood as being limited to the following embodiments. The embodiments are provided to more completely explain the present invention to one of ordinary skill in the art. Accordingly, in the drawings, shapes of elements may be exaggerated for clearer description. Also, the terms used in the specification and the claims should not be limited to general or lexical meanings and should be interpreted as meanings and concepts coinciding with the technical concept of the present invention on the basis of a principle that the inventor can appropriately define the concept of the terms to describe the invention in the best manner.

The present invention relates to a combustion generation apparatus 1 capable of generating power using organic materials.

Figure 1:
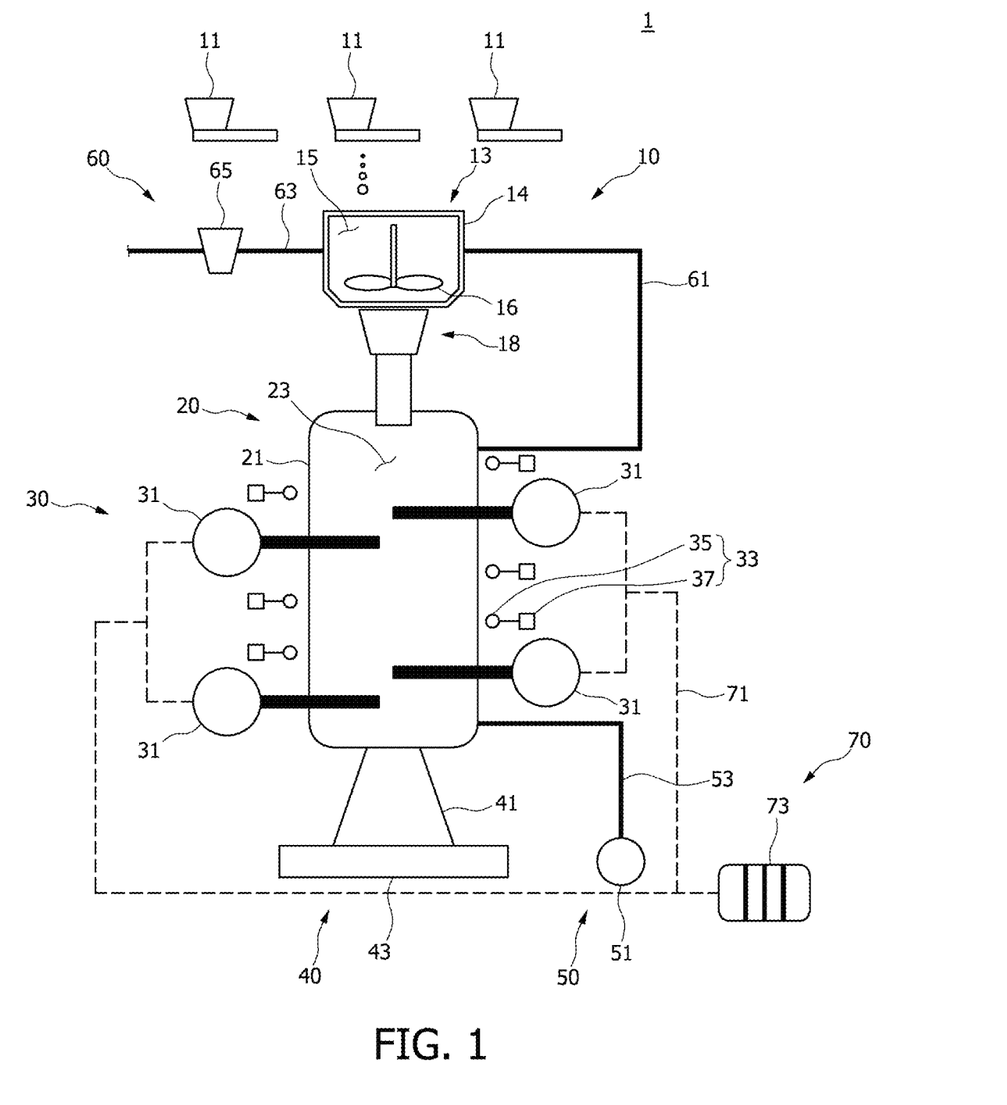
FIG. 1 is a view of a combustion generation apparatus according to one embodiment of the present invention.

FIG. 1 is a view of a combustion generation apparatus according to one embodiment of the present invention. Referring to FIG. 1, the combustion generation apparatus 1 includes a fuel supply unit 10, a reaction unit 20, a generation unit 30, a reaction by-product discharge unit 40, an oxidizer supply unit 50, a gas discharge unit 60, and a power unit 70.

The fuel supply unit 10 mixes and supplies different organic raw materials to the reaction unit 20. The fuel supply unit 10 may uniformly mix and supply a plurality of organic materials to the reaction unit 20.

Herein, organic raw materials include used coffee grounds, coconut dregs, forest dregs, wood pellets, waste cooking oil, and the like. On the other hand, any raw materials used as raw materials for biomass are applicable as organic raw materials without limit.

The fuel supply unit 10 includes a single fuel supplier 11, a fuel mixer 13, and a mixed fuel supplier 18.

The single fuel supplier 11 supplies a single organic raw material to the fuel mixer 13. A plurality of such single fuel suppliers 11 may be provided. The plurality of single fuel suppliers 11 may supply different organic raw materials to the fuel mixer 13. For example, any one of the plurality of single fuel suppliers 11 may supply only used coffee grounds to the fuel mixer 13. Another of the plurality of single fuel suppliers 11 may supply coconut dregs to the fuel mixer 13. Another of the plurality of single fuel suppliers 11 may supply forest dregs to the fuel mixer 13. In addition to the above-described embodiment, a variety of organic raw materials may be supplied to the fuel mixer 13 through the single fuel suppliers 11.

The fuel mixer 13 may uniformly mix the organic raw materials supplied by the single fuel suppliers 11. The fuel mixer 13 includes a mixing chamber 14 and a fuel mixing member 16.

The mixing chamber 14 may have a mixing space 15 therein. An inlet capable of receiving organic raw materials supplied by the single fuel suppliers 11 may be formed in the mixing chamber 14. The mixing chamber 14 may be provided in a sealed form.

The fuel mixing member 16 may be located in the mixing chamber 14. The fuel mixing member 16 may mix a plurality of organic raw materials supplied by the single fuel suppliers 11. For example, the fuel mixing member 16 is provided as a rotatable device and may be provided as a stirrer capable of uniformly mixing organic raw materials in the mixing space 15 by stirring the organic raw materials. On the other hand, any devices capable of mixing a plurality of organic raw materials are applicable to the fuel mixing member 16 without limit.

The mixed fuel supplier 18 may be connected to the fuel mixer 13. The mixed fuel supplier 18 may receive and supply organic raw materials uniformly mixed by the fuel mixer 13 to a combustion chamber 21 which will be described below. For example, the mixed fuel supplier 18 may be provided as a pipe with an openable inlet to which the fuel mixer 13 is connected.

The reaction unit 20 may generate heat energy by burning organic raw materials. For example, the reaction unit 20 may include the combustion chamber 21.

The combustion chamber 21 may be connected to the mixed fuel supplier 18. The combustion chamber 21 may receive organic materials from the mixed fuel supplier 18. An internal space of the combustion chamber 21 may be provided as a combustion space 23. A plurality of such supplied organic raw materials may be burned in the combustion space 23. For example, the combustion space 23 may receive an oxidizer in a gaseous state from an oxidizer supplier 51 which will be described below to burn the organic raw materials.

The generation unit 30 may generate power using heat energy generated by the reaction unit 20. The generation unit 30 may supply the generated power to the power unit 70 which will be described below.

The generation unit 30 may include an internal generator 31 and an external generator 33.

The internal generator 31 may generate power using heat energy generated by a combustion reaction of organic materials in the combustion chamber 21. For example, the internal generator 31 may include a plurality of Stirling engines. The Stirling engines may be located in the combustion space 23 in the combustion chamber 21. The Stirling engines may generate power using the generated heat energy. Unlike the above-described example, any devices capable of being located in the combustion space 23 and generating power using generated heat energy are applicable without limit.

The external generator 33 may generate power using heat energy released outward from the combustion chamber 21. For example, the external generator 33 may include a collector 35 and a generating element 37.

The collector 35 may absorb heat energy released from the combustion chamber 21. The collector 35 may be located to be adjacent to the combustion chamber 21. The collector 35 may be located outside the combustion chamber 21. A plurality of such collectors 35 may be located around the combustion chamber 21.

The generating element 37 may receive the heat energy absorbed by the collector 35. The generating element 37 may generate power using the heat energy. The generating element 37 may be provided while being connected to the collector 35.

According to the present invention, since power may be generated by the external generator 33 using heat released from the combustion chamber 21 in addition to heat generated in the combustion chamber 21, power generation efficiency may be maximized. Also, eco-friendly energy may be generated using organic raw materials.

The reaction by-product discharge unit 40 may discharge reaction by-products generated after organic raw materials are burned in the combustion chamber 21. Here, the reaction by-products may be materials including a solid and a liquid among solid, liquid, and gaseous materials generated after burning organic raw materials.

The reaction by-product discharge unit 40 includes a reaction by-product container 43 and a reaction by-product supply pipe 41.

The reaction by-product container 43 is a container which accommodates the reaction by-products generated in the combustion chamber 21. The reaction by-product container 43 may have an accommodation space therein. The reaction by-product container 43 may be provided to be attachable to or detachable from the combustion generation apparatus 1. When the reaction by-product container 43 is filled with a certain or more amount of the reaction by-products, the reaction by-product container 43 may be separated from the combustion generation apparatus 1 to discharge the reaction by-products. The reaction by-product container 43 may be formed of a high heat-resistant material.

One end of the reaction by-product supply pipe 41 may be connected to the combustion chamber 21 and the other end thereof may be connected to the reaction by-product container 43. The reaction by-product supply pipe 41 may supply the reaction by-products supplied from the combustion chamber 21 to the reaction by-product container 43. For example, the reaction by-product supply pipe 41 may have a shape which has a cross section increasing from one end to the other end. For example, the reaction by-product supply pipe 41 may have a shape which has a cross section increasing in a direction from the combustion chamber 21 toward the reaction by-product container 43. For example, the reaction by-product supply pipe 41 may have an upside-down funnel shape. For example, the reaction by-product supply pipe 41 may have a circular cross section.

Unlike the above-described example, the reaction by-product supply pipe 41 may have a shape having the same cross section.

The oxidizer supply unit 50 may supply an oxidizer to the combustion chamber 21. The oxidizer may be provided as a material which accelerates a combustion reaction in a reaction space. For example, the oxidizer may be provided as oxygen, air including oxygen, or ozone. Unlike the above, any oxidizers capable of oxidizing organic materials are applicable without limit.

The oxidizer supply unit 50 may include an oxidizer supplier 51 and an oxidizer supply line 53.

The oxidizer supplier 51 may supply a gaseous oxidizer to the combustion chamber 21. For example, the oxidizer supplier 51 may be provided as a device which includes a fan for introducing outside air and is capable of supplying the outside air to the oxidizer supply line 53 which will be described below. Unlike the above, the oxidizer supplier 51 may be provided as an air pump capable of supplying outside air. Unlike the above-described examples, any devices capable of supplying an oxidizer are applicable without limit.

One end of the oxidizer supply line 53 may be connected to the oxidizer supplier 51 and the other end thereof may be connected to the combustion chamber 21. The oxidizer supply line 53 may supply the oxidizer supplied by the oxidizer supplier 51 to the combustion chamber 21.

The gas discharge unit 60 may discharge a combustion gas generated after a combustion reaction of organic materials in the combustion chamber 21.

The gas discharge unit 60 includes a gas supply line 61, a gas discharge line 63, and a combustion gas filter 65.

The gas supply line 61 may supply the combustion gas of the combustion chamber 21 to the fuel mixer 13. One end of the gas supply line 61 may be connected to the combustion chamber 21 and the other end thereof may be connected to the fuel mixer 13.

The combustion gas supplied through the gas supply line 61 may flow into the fuel mixer 13 and then may exchange heat with organic materials located in the fuel mixer 13.

For example, organic materials directly supplied to the fuel mixer 13 may exchange heat while coming in direct contact with organic materials. Through this, water included in the organic materials may be evaporated.

That is, a high-temperature combustion gas exchanges heat with low-temperature organic materials and supplies heat to the organic materials such that water included in the organic materials is evaporated to allow the organic materials to be well burned during combustion.

As another example, the fuel mixer 13 may include a pipe therein, through which combustion gas passes, and a combustion gas may provide heat to organic materials while passing through the pipe.

The gas discharge line 63 may discharge the combustion gas discharged after exchanging heat with the organic materials in the fuel mixer 13. The gas discharge line 63 may be connected to the fuel mixer 13.

The combustion gas filter 65 may be coupled to the gas discharge line 63. The combustion gas filter 65 may filter out foreign substances and harmful gases in the combustion gas.

The power unit 70 may store and supply power received from the generation unit 30 to another apparatus. The power unit 70 includes a power supply line 71 and a power supplier 73.

The power supply line 71 may be connected to the internal generator 31 or the external generator 33 to supply received power to the power supplier 73.

The power supplier 73 may store the supplied power and may be connected to another external apparatus to supply the power to the external apparatus.

Figure 2:
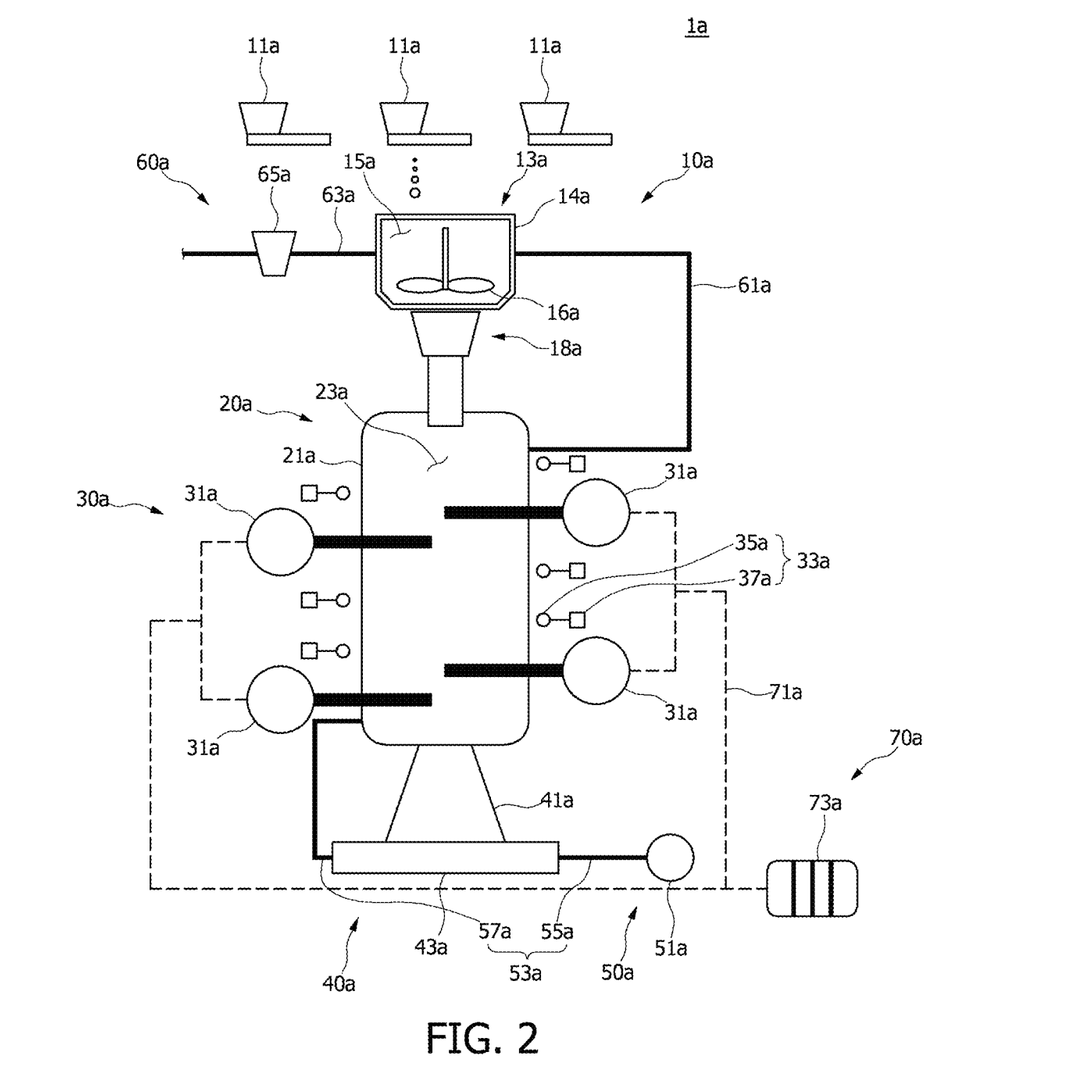
FIGS. 2 to 4 are views of combustion generation apparatuses according to other embodiments of the present invention.
Figure 3:
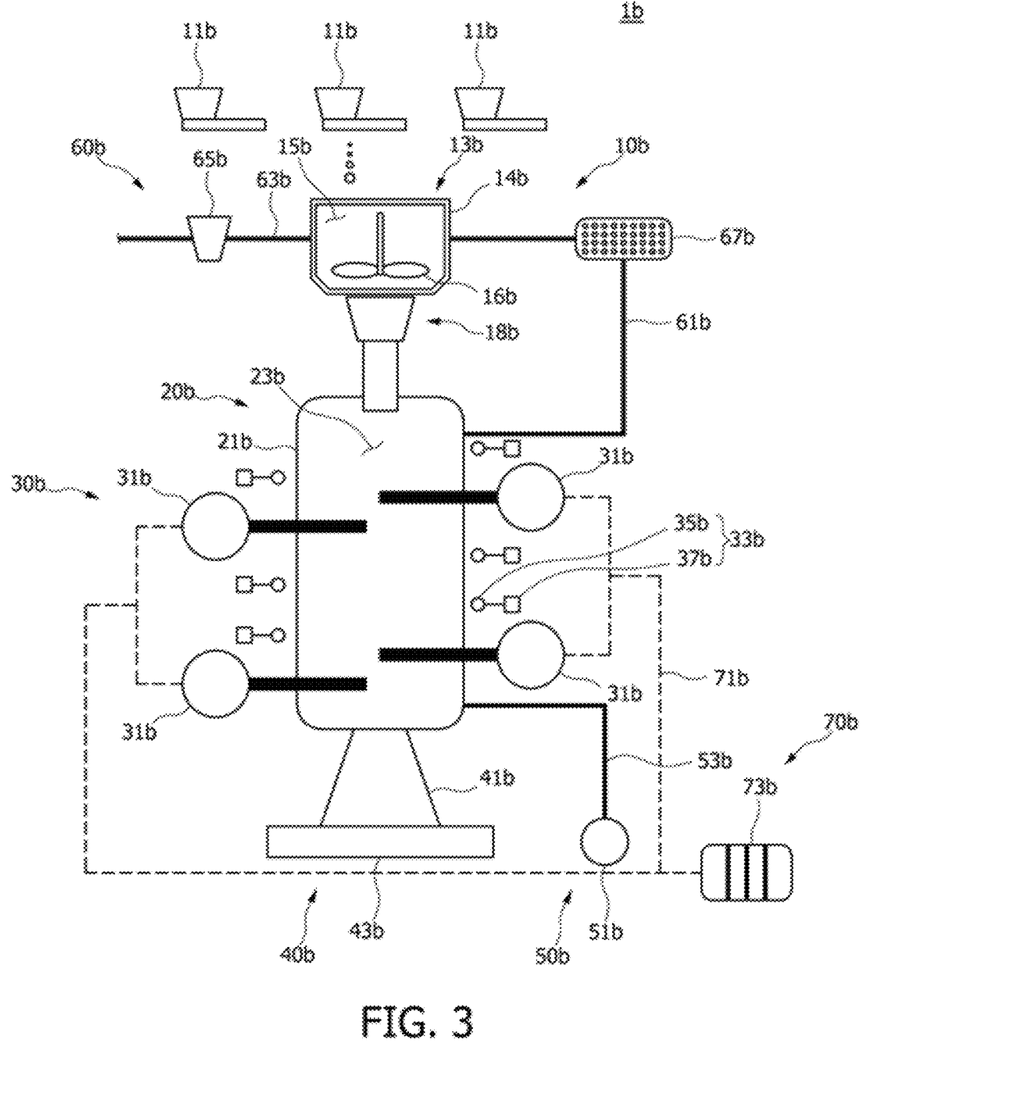
Figure 4:
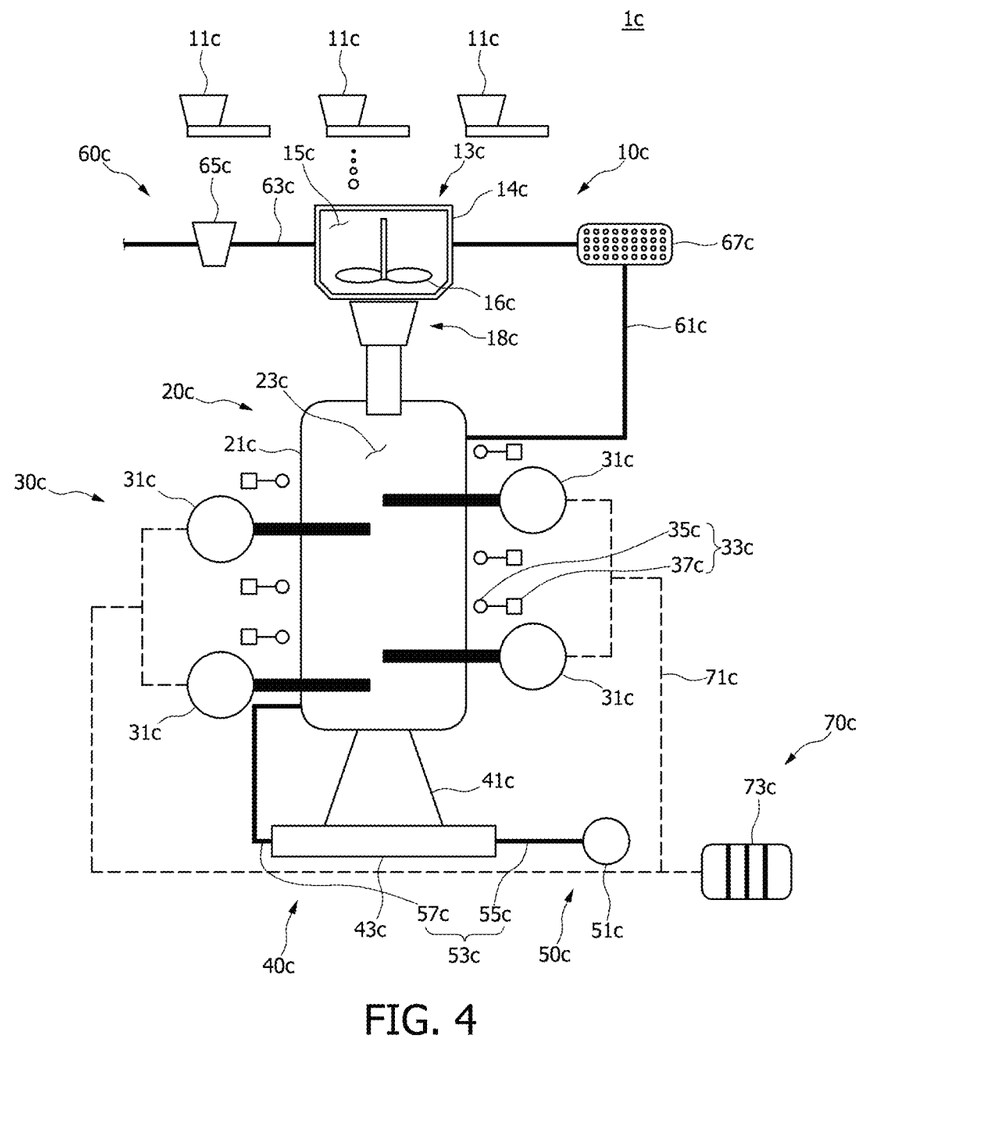
Figure 5:
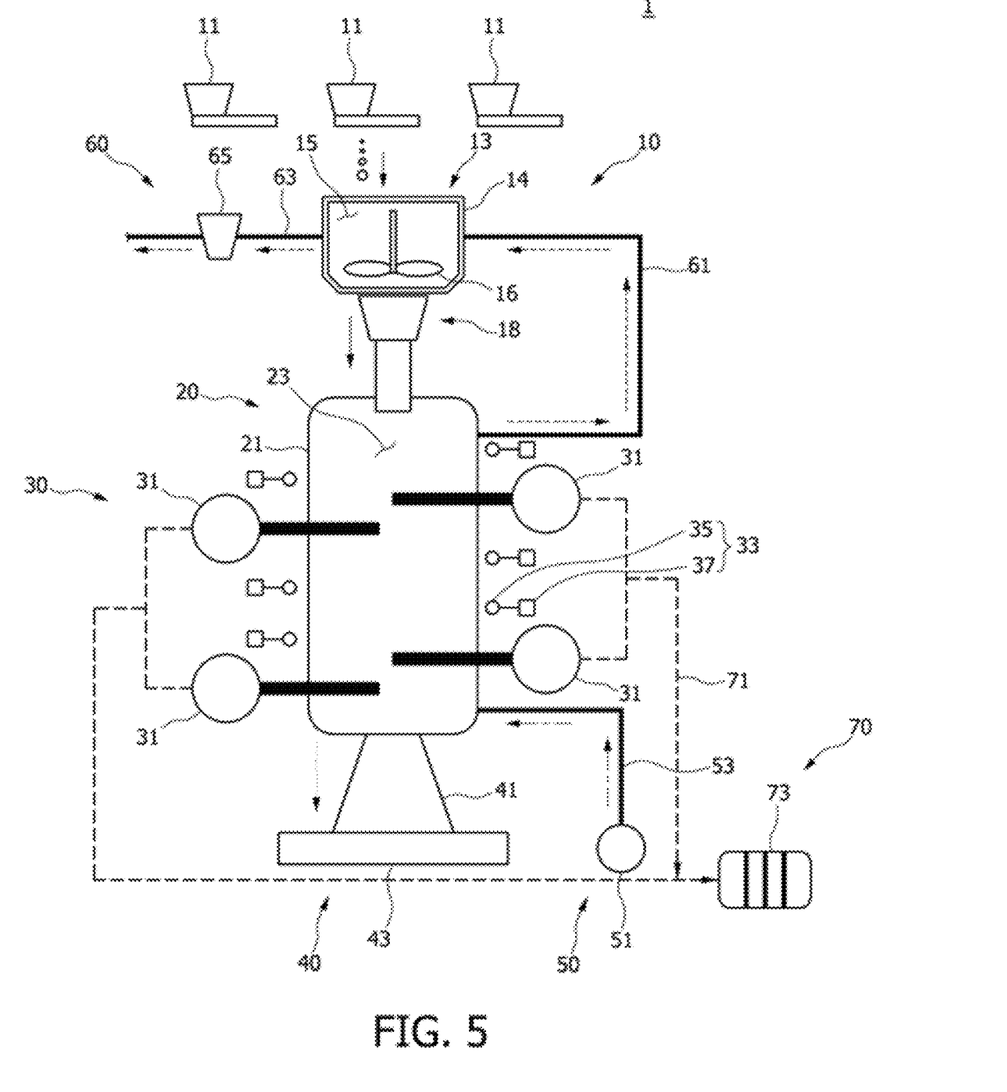
FIG. 5 is a view schematically illustrating that an organic raw material, a reaction by-product, a combustion gas, and an oxidizer are moved during a process of the combustion generation apparatus of FIG. 1.
Figure 6:
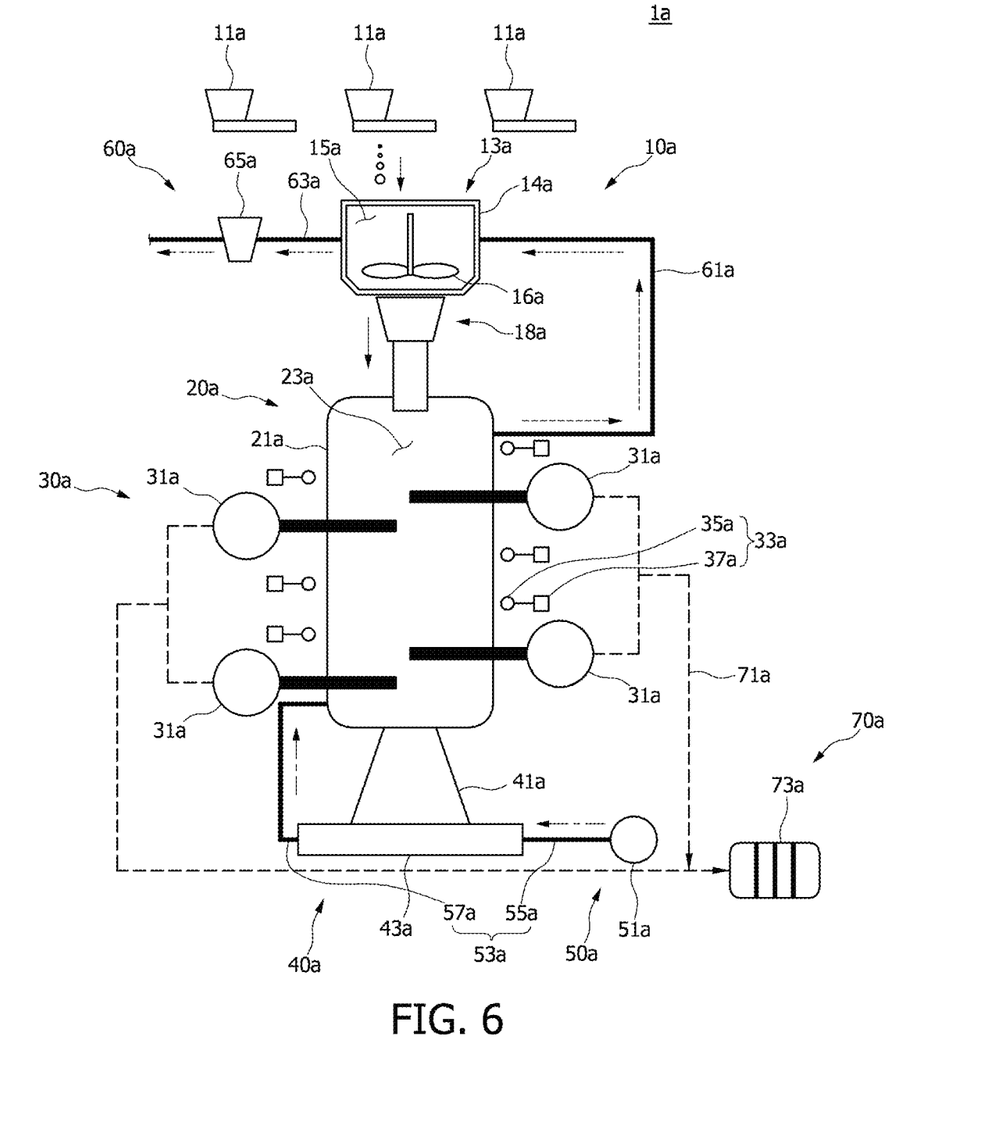
FIG. 6 is a view schematically illustrating that an organic raw material, a reaction by-product, a combustion gas, and an oxidizer are moved during a process of the combustion generation apparatus of FIG. 2.
Figure 7:
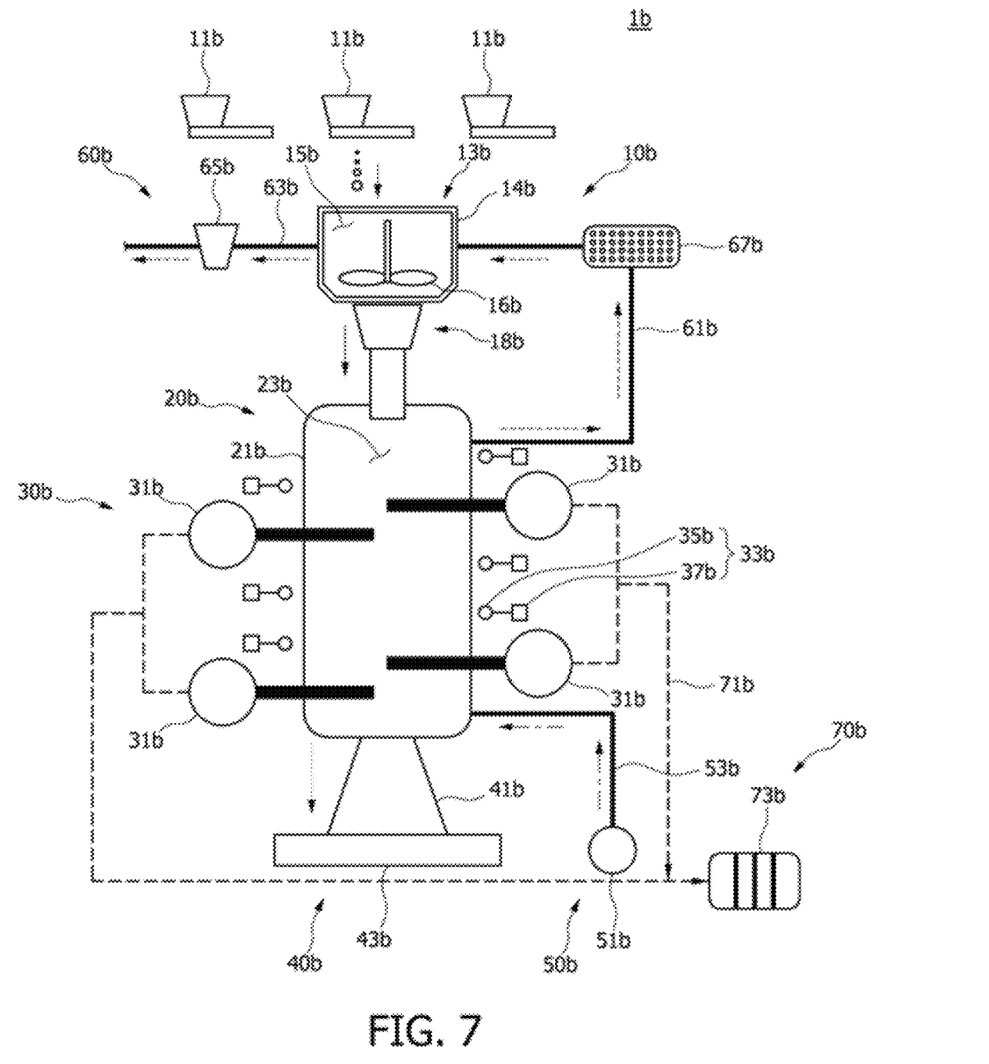
FIG. 7 is a view schematically illustrating that an organic raw material, a reaction by-product, a combustion gas, and an oxidizer are moved during a process of the combustion generation apparatus of FIG. 3.
Figure 8:
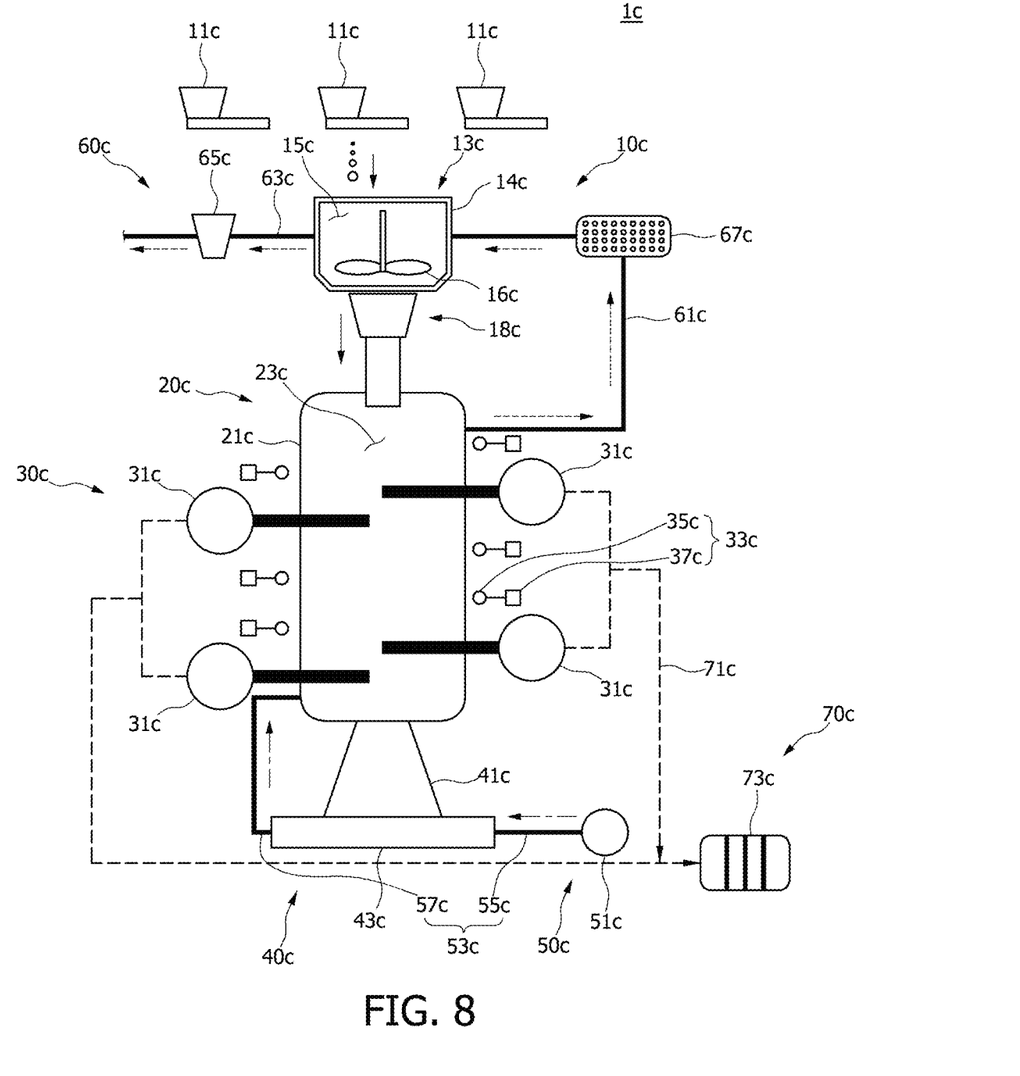
FIG. 8 is a view schematically illustrating that an organic raw material, a reaction by-product, a combustion gas, and an oxidizer are moved during a process of the combustion generation apparatus of FIG. 4.

FIGS. 2 to 4 are views of combustion generation apparatuses according to other embodiments of the present invention.

A combustion generation apparatus 1*a* of FIG. 2 is generally equal to the combustion generation apparatus 1 of FIG. 1. However, an oxidizer supply unit 50*a* of the combustion generation apparatus 1*a* of FIG. 2 may differ from the oxidizer supply unit 50 of the combustion generation apparatus 1 of FIG. 1.

The oxidizer supply unit 50*a* of FIG. 2 may include an oxidizer supplier 51*a* and an oxidizer supply line 53*a*.

The oxidizer supplier 51*a* of FIG. 2 may be generally equal to the oxidizer supplier 51 of FIG. 1. The oxidizer supply line 53*a* includes a first oxidizer supply line 55*a* and a second oxidizer supply line 57*a*.

One end of the first oxidizer supply line 55*a* may be connected to the oxidizer supplier 51*a* and the other end thereof may be connected to a reaction by-product container 43*a*. The first oxidizer supply line 55*a* may supply an oxidizer supplied from the oxidizer supplier 51*a* to the reaction by-product container 43*a*. The oxidizer supplied to an inside of the reaction by-product container 43*a* may exchange heat with reaction by-products located in the reaction by-product container 43*a*. The reaction by-products in the reaction by-product container 43*a* are materials generated after a combustion reaction and are at a relatively higher temperature than that of the oxidizer. Accordingly, the oxidizer may receive heat from the reaction by-products through heat exchange. The oxidizer increases in temperature by a certain or more level before being supplied to a combustion chamber 21*a* such that the combustion reaction may be effectively performed in the combustion chamber 21*a*.

For example, heat exchange in the reaction by-product container 43*a* may be performed while a gaseous oxidizer may be directly supplied and come into direct contact with reaction by-products to exchange heat.

Unlike the above, a pipe through which an oxidizer can pass is located in the reaction by-product container 43*a* such that the oxidizer which flows through the pipe may exchange heat with external reaction by-products.

One end of the second oxidizer supply line 57*a* may be connected to the reaction by-product container 43*a* and the other end thereof may be connected to the combustion chamber 21*a*. The second oxidizer supply line 57*a* may supply the oxidizer, which has exchanged heat with the reaction by-products in the reaction by-product container 43*a* to the combustion chamber 21*a*.

A combustion generation apparatus 1*b* of FIG. 3 is generally equal to the combustion generation apparatus 1 of FIG. 1. However, a gas discharge unit 60*b* of the combustion generation apparatus 1*b* of FIG. 3 may differ from the gas discharge unit 60 of the combustion generation apparatus 1 of FIG. 1.

The gas discharge unit 60*b* of FIG. 3 includes a gas supply line 61*b*, a gas discharge line 63*b*, a combustion gas filter 65*b*, and a pollutant removal portion 67*b*.

The gas supply line 61b, the gas discharge line 63b, and the combustion gas filter 65b of FIG. 3 may be generally equal to the gas supply line 61, the gas discharge line 63, and the combustion gas filter 65 of FIG. 1.

The pollutant removal portion 67b of FIG. 3 may be installed on the gas supply line 61b. The pollutant removal portion 67b may include a catalyst therein. The catalyst may remove pollutants from a combustion gas supplied from a combustion chamber 21b. For example, the catalyst may be platinum (Pt), palladium (Pd), rhodium (Rh), nickel (Ni), or a precious metal-included catalyst. Unlike the above, the catalyst may be provided in a form in which metals such as ferrum (Fe), copper (Cu), chrome (Cr), cobalt (Co), and the like are mixed or one of them is solely included.

Pollutants in a reaction gas are removed by the pollutant removal portion 67b and the combustion gas filter 65b to minimize pollutants of the reaction gas which is discharged outward such that environmental pollution may be minimized.

A combustion generation apparatus 1c of FIG. 4 is generally equal to the combustion generation apparatus 1 of FIG. 1. However, an oxidizer supply unit 50c and a gas discharge unit 60c of the combustion generation apparatus 1c of FIG. 4 may differ from the oxidizer supply unit 50 and the gas discharge unit 60 of the combustion generation apparatus 1 of FIG. 1.

The oxidizer supply unit 50c of FIG. 4 may be generally equal to the oxidizer supply unit 50a of FIG. 2. The gas discharge unit 60c of FIG. 4 may be generally equal to the gas discharge unit 60b of FIG. 3.

FIGS. 5 to 8 schematically illustrate paths through which organic materials, reaction by-products, a combustion gas, and an oxidizer are supplied to or discharged from the combustion generation apparatuses of FIGS. 1 to 4.

Referring to the drawings, the combustion generation apparatuses 1, 1a, 1b, and 1c of FIGS. 1 to 4 may supply organic materials to reaction units 20, 20a, 20b, and 20c and may supply reaction by-products generated by the reaction units 20, 20a, 20b, and 20c to by-product discharge units 40, 40a, 40b, and 40c to discharge the reaction by-products outward. An oxidizer may be directly supplied to the combustion chamber 21 or 21b, or may pass through the reaction by-product container 43a or 43c, may exchange heat with the reaction by-products in the reaction by-product container 43a or 43c, and may be supplied to the combustion chamber 21, 21a, 21b, or 21c.

A combustion gas may be generated by the combustion chamber 21, 21a, 21b, or 21c, may sequentially pass through the gas supply line 61, 61a, 61b, or 61c, the gas discharge line 63, 63a, 63b, or 63c, the fuel mixer 13, 13a, 13b, or 13c, and the combustion gas filter 65, 65a, 65b, or 65c, and may be discharged outward. The combustion gas may pass through the pollutant removal portion 67b installed on the gas supply line 61b or the combustion gas filter 65, 65a, 65b, or 65c to remove pollutants therein and then may be discharged outward.

As described above, according to one embodiment of the present invention, the combustion generation apparatus 1 may generate power using heat generated in the combustion chamber 21 and heat released outward therefrom. That is, power generation efficiency may be increased by generating power even using heat released outward from the combustion chamber 21.

Also, the combustion generation apparatus 1 according to one embodiment of the present invention may minimize environmental pollution by minimizing pollutants in combustion gas discharged outward through the pollutant removal portion 67b or the combustion gas filter 65.

The above detailed description exemplifies the present invention. Also, the exemplary embodiments of the present invention have been described above and the present invention may be used with a variety of other combinations and changes in a variety of different environments. That is, changes or modifications may be made within the scope of the concept of the present invention disclosed herein, the scope of equivalents of the drafted contents, and/or the scope of technologies or knowledge in the art. The above-described embodiments are for explaining best states for embodying the technical concept of the present invention, and a variety of changes required by a detailed application field and use of the present invention may be made. Accordingly, the above detailed description of the present invention is not intended to limit the present invention to the above embodiments. Also, it should be understood that the attached claims include other embodiments.

The invention claimed is:

1. A combustion generation apparatus, which generates power using organic raw materials, comprising:
    a fuel supply unit which comprises a plurality of single fuel suppliers configured to supply different organic raw materials, a fuel mixer configured to mix the organic raw materials supplied by the single fuel suppliers, and a mixed fuel supplier configured to receive the organic raw materials uniformly mixed in the fuel mixer;
    a reaction unit which comprises a combustion chamber configured to burn the organic raw materials supplied by the mixed fuel supplier; and
    a generation unit which comprises an internal generator configured to generate power using heat energy generated by a combustion reaction of the organic materials in the combustion chamber and an external generator configured to generate power using heat energy released outward from the combustion chamber, wherein the external heat exchanger include a collector located around the combustion chamber.

2. The combustion generation apparatus of claim 1, wherein the internal generator generates power using a Stirling engine located in an internal space of the combustion chamber, and wherein the external generator comprises a collector located around the combustion chamber and configured to absorb heat energy released outward from the combustion chamber and a generating element configured to generate power using heat supplied from the collector.

3. The combustion generation apparatus of claim 1, wherein the fuel mixer comprises:
    a mixing chamber which has a mixing space therein, in which the organic materials are mixed; and
    a fuel mixing member located in the mixing chamber and configured to mix the organic raw materials.

4. The combustion generation apparatus of claim 2, further comprising a reaction by-product discharge unit configured to discharge reaction by-products generated after the organic raw materials are burned in the combustion chamber, wherein the reaction by-product discharge unit comprises:
    a reaction by-product container which accommodates the reaction by-products generated in the combustion chamber; and
    a reaction by-product supply pipe connected to the combustion chamber and the reaction by-product container and configured to supply the reaction by-products generated in the combustion chamber to the reaction by-product container.

5. The combustion generation apparatus of claim 4, wherein the reaction by-product supply pipe is provided to have a shape which has a cross section gradually increasing from the combustion chamber toward the reaction by-product container.

6. The combustion generation apparatus of claim 4, further comprising an oxidizer supply unit configured to supply an oxidizer to the combustion chamber, wherein the oxidizer supply unit comprises:
   an oxidizer supplier configured to supply a gaseous oxidizer to the combustion chamber; and
   an oxidizer supply line connected to the oxidizer supplier and configured to supply the oxidizer to the combustion chamber.

7. The combustion generation apparatus of claim 6, wherein the oxidizer supply line comprises:
   a first oxidizer supply line connected to the oxidizer supplier and the reaction by-product container and configured to supply the oxidizer supplied by the oxidizer supplier to the reaction by-products; and
   a second oxidizer supply line connected to the combustion chamber and the reaction by-product container and configured to supply the oxidizer, which exchanges heat with the reaction by-products in the reaction by-product container, to the combustion chamber.

8. The combustion generation apparatus according to claim 1, further comprising a gas discharge unit configured to discharge a combustion gas generated after a combustion reaction of the organic materials in the combustion chamber, wherein the gas discharge unit comprises:
   a gas supply line connected to the combustion chamber and configured to supply the combustion gas of the combustion chamber to the fuel mixer;
   a gas discharge line configured to discharge outward the combustion gas which exchanges heat with the organic materials in the fuel mixer and is discharged; and
   a combustion gas filter coupled to the gas discharge line and configured to filter the combustion gas.

9. The combustion generation apparatus of claim 8, wherein the gas discharge unit further comprises a pollutant removal portion installed on the gas supply line and having a catalyst to remove pollutants of the combustion gas supplied from the combustion chamber, and the combustion generation apparatus further comprising a power unit configured to store power supplied from the generation unit and to supply the power to another apparatus.

10. The combustion generation apparatus of claim 8, wherein the organic materials comprise used coffee grounds, coconut dregs, forest dregs, wood pellets, and waste cooking oil.

* * * * *